United States Patent [19]

Kramer

[11] 4,314,283
[45] Feb. 2, 1982

[54] DIFFRACTION BASED LIGHT COLLECTOR

[75] Inventor: Charles J. Kramer, Pittsford, N.Y.

[73] Assignee: Xerox Corporation, Stamford, Conn.

[21] Appl. No.: 183,121

[22] Filed: Sep. 2, 1980

[51] Int. Cl.³ ............................................... H04N 1/24
[52] U.S. Cl. .................................. 358/294; 250/228; 350/96.19; 350/162 R; 358/293
[58] Field of Search ............... 358/294, 293; 250/216, 250/228, 237 R, 578; 350/96.1, 96.19, 162 R

[56] References Cited

U.S. PATENT DOCUMENTS

| | | | |
|---|---|---|---|
| 2,945,958 | 7/1960 | Morris | 250/230 |
| 3,455,637 | 7/1969 | Howard | 356/434 |
| 3,603,730 | 9/1971 | Weigl et al. | 358/294 |
| 3,681,527 | 8/1972 | Nishiyama et al. | 358/294 |
| 3,774,987 | 11/1973 | Bolvin | 350/96.19 |
| 3,809,455 | 5/1974 | Pekau | 350/96.19 |
| 3,845,239 | 10/1974 | Granzow et al. | 358/286 |
| 3,980,893 | 9/1976 | Merlen | 250/572 |
| 3,987,301 | 10/1976 | O'Connor | 250/227 |
| 4,001,581 | 1/1977 | Murata | 250/239 |
| 4,012,585 | 3/1977 | Chen | 358/285 |
| 4,015,081 | 3/1977 | Starkweather | 358/206 |
| 4,068,121 | 1/1978 | Bringhurst | 350/96.19 |
| 4,180,702 | 12/1979 | Sick et al. | 250/227 |
| 4,227,769 | 10/1980 | Philips | 350/96.19 |

FOREIGN PATENT DOCUMENTS

| | | |
|---|---|---|
| 2102 | 5/1979 | European Pat. Off. . |
| 2653230 | 7/1977 | Fed. Rep. of Germany . |

*Primary Examiner*—Howard W. Britton

[57] ABSTRACT

A light collector is provided for collecting light reflected from an information-bearing surface. In one embodiment, used in a flying spot scanning system, a generally cylindrical rod is placed adjacent the information bearing surface, the rod having photodetectors placed at the ends thereof. The rod is of glass construction with a longitudinally-extending portion thereof fabricated as a variable period diffraction grating. This grating is located proximate to the scanned surface so that incident light reflected from the surface strikes the grating and is coupled into the rod via diffraction. The grating periods are selected in conjunction with the light incidence angles as to optimize the amount of light collected by the photodetectors.

16 Claims, 5 Drawing Figures

DIFFRACTION BASED LIGHT COLLECTOR

This invention relates to a light collector for collecting light reflected from an information bearing surface and more particularly to a light collector in the form of a generally cylindrical rod, a portion of which is formed as a diffraction grating.

There are a number of present systems in the telecommunication, facsimile and xerographic areas wherein the information content on an original document member is scanned by a flying spot beam, and the light reflections therefrom converted to analog image signals representative of the information being scanned. One conversion method utilizes a light collector disposed adjacent the original document to gather or collect the scattered and reflected light emanating from the document surface. A similar technique is used to scan and detect developed toner images on a photoconductive surface.

While light collectors may take various forms, a preferred type, because of its small size and relatively low cost, is a transparent rod. However, the light collection efficiency of a rod is so low as to effectively rule out use of this device. Attempts to improve the collection efficiency of rod-type collectors by applying various reflective or opaque coatings to the exterior thereof has resulted in some improvement. Still, despite modifications and improvements, the collection efficiency of rod-type collectors remains marginal.

This invention relates to a light collector comprising a transparent rod-like member having at least one photodetector placed therein, said member having on one surface thereof a longitudinally extending variable period diffraction grating, said grating period varying in a manner such that light incident on said grating is coupled to said photodetector either directly or by internal reflection along the interior surface of said member.

While the present invention is useful with any optical system which scans and detects information on a surface, the following description is directed to the use of a light collector in a multi-mode reproduction apparatus. This apparatus is operable selectively in a COPY mode to xerographically make copies of original documents in the manner typical of xerographic copiers or machines, in a WRITE mode to xerographically produce copies from image signals input thereto using a flying spot type scanner, and in a READ mode to read images developed on the machine photoreceptor with the same flying spot scanner to produce image signals representative thereof and thereby convert the image to electronic signals.

Figure 1:
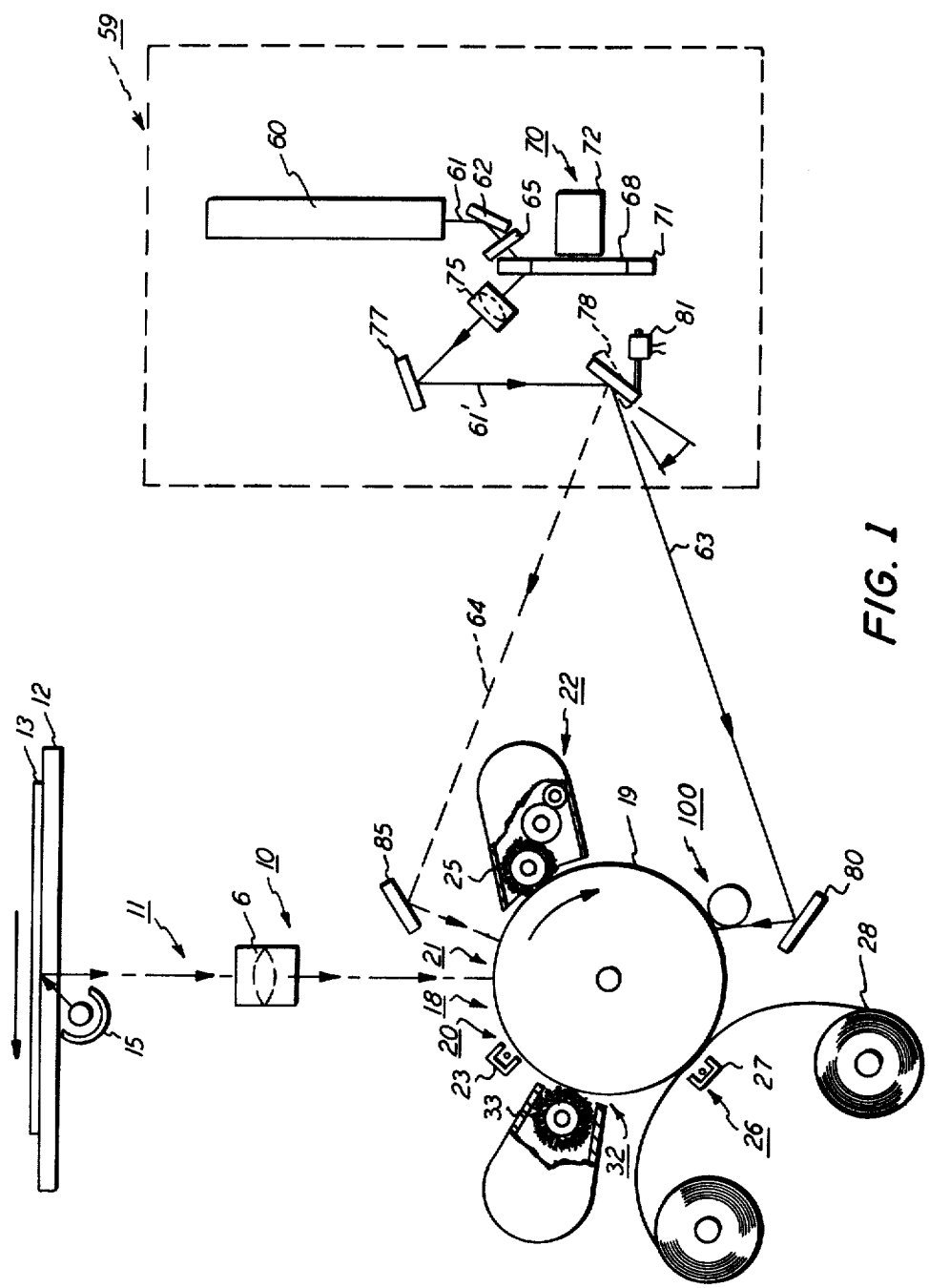
FIG. 1 is a schematic view showing an exemplary apparatus for carrying out multiple function image processing incorporating the light collector of the present invention.

Referring now to FIG. 1 of the drawings, there is shown an exemplary xerographic type reproduction apparatus 10 incorporating the present invention. Xerographic reproduction apparatus 10 includes a viewing station or platen 12 where document originals 13 to be reproduced or copied are placed. For operation in the COPY mode as will appear more fully herein, a light/lens imaging system 11 is provided, the light/lens system including a light source 15 for illuminating the original 13 at platen 12 and a lens 16 for transmitting image rays reflected from the original 13 to the photoconductive surface 19 of drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging. A suitable developing mechanism, which may for example comprise a magnetic brush 25, is provided at developing station 22 for developing the latent electrostatic images created on drum 18.

At transfer station 26, corona transfer means 27 effects transfer of the developed image to a suitable copy substrate material 28. A suitable drum cleaning device such as a rotating cleaning brush 33 is provided at cleaning station 32 for removing leftover developing materials from the surface 19 of drum 18. Brush 33 may be disposed in an evacuated housing through which leftover developer materials removed from the drum surface by the cleaning brush are exhausted.

In the example shown, photoconductive surface 19 comprises a uniform layer of photoconductive material such as amorphous selenium on the surface of drum 18. Drum 18 is supported for rotation by suitable bearing means (not shown). A suitable drive motor (not shown) is drivingly coupled to drum 18 and rotates drum 18 in the direction shown by the solid line arrow when processing copies.

When operating in the COPY mode, the photoconductive surface 19 of drum 20 is charged to a uniform level by corona charging means 23. Platen 12 and the original document 13 thereon is irradiated by light source 15, the light reflected from document 13 being focused onto the photoconductive surface 19 of drum 18 by lens 16 at exposure station 21. Platen 12 and the document 13 thereon are at the same time moved in synchronism with rotation of the drum 18. The light reflected from the original 13 selectively discharges the charged photoconductive surface in a pattern corresponding to the image that comprises the original document.

The latent electrostatic image created on the surface 19 of drum 18 is developed by magnetic brush 25 and transferred to copy substrate material 28 through the action of transfer corona means 27. Following transfer, the photoconductive surface 19 of drum 18 is cleaned by cleaning brush 33 to remove leftover developer material. A suitable fuser or fixing device (not shown) fixes the image transferred to copy substrate material 28 to render the copy permanent.

While a drum type photoconductor is illustrated other photoconductor types such as belt, web, etc. may be envisioned. Photoconductive materials other than selenium, as for example, organic may also be contemplated. And while a scan type imaging system is illustrated, other types of imaging systems such as full frame flash, may be contemplated.

The photoconductor may be opaque, that is, impervious to light, or wholly or partially transparent. The exemplary drum 18 typically has an aluminum substrate which renders the drum opaque. However, other substrate materials such as glass may be contemplated, which would render drum 18 wholly or partially transparent. One material consists of an aluminized mylar substrate having a layer of selenium dispersed in poly-N-vinyl carbazole with a transparent polymer overcoating containing a charge transport compound such as pyrene.

Xerographic reproduction apparatus 10 includes a flying spot scanner 59. Scanner 59 has a suitable flux source of electro-magnetic radiation such as laser 60. The collimated beam 61 of monochromatic radiation generated by laser 60 is reflected by mirror 62 to a modulator 65, which for operation in the WRITE mode, modifies the beam 61 in conformance with information contained in image signals input thereto, as will appear. Modulator 65 may comprise any suitable modulator, such as acousto-optic or electro-optic type modulators for imparting the informational content of the image signals input thereto to beam 61.

Beam 61 is diffracted by disc deflector 68 of a holographic deflector unit 70. Deflector 68 comprises a substantially flat disc-like element having a plurality of grating faces or facets 71 forming the outer periphery thereof. Deflector 68 which is preferably glass, is driven by motor 72. Preferably, deflector 68 is disposed so that light beam 61 is incident to the facets 71 thereof at an angle of substantially 45°. The diffracted scanning beam 61' output by deflector 68 exits at a complementary angle.

The scanning beam 61' output by deflector 68 passes to an imaging lens 75. As shown, lens 75 is located in the optical path between deflector 68 and mirror 77, lens 75 being of a diameter suitable to receive and focus the scanning light beam diffracted by facets 71 of deflector 68 to a selected spot in the focal plane proximate the surface 19 of drum 18, as will appear.

The scanning beam 61' from lens 75 is reflected by mirror 77 to read/write control mirror 78, which in turn, reflects the beam to provide selectively image READ beam 63 (shown by solid line in FIG. 1) or image WRITE beam 64 (shown by dotted line in FIG. 1). Image READ beam 63 is reflected by mirror 80 to a location on the surface 19 of drum 18 downstream of developer 22, while image WRITE beam 64 is reflected by mirror 85 to a location on surface 19 upstream of developer 22.

In the case where the photoconductive material is opaque, light impinging on the surface 19 of drum 18 is scattered. In the case where the photoconductive material is transparent, the light is transmitted, depending on the degree of transparency of the photoconductive material through the photoconductive material to the drum interior. As will be understood, scattered light is composed of both specular and diffuse reflected light while transmitted light is composed of specular and diffuse transmitted light. The scattered or transmitted light from the photoconductive surface 19 of drum 18 and the developed image thereon is collected in collector 100, and there converted to image signals, in a manner described in detail below.

Read/write control mirror 78 is supported for limited movement between a READ position (shown in solid line in the drawing) and a WRITE position (shown in dotted line in the drawing). A suitable driving mechanism such as solenoid 81 is provided to selectively move the mirror 78 from one position to the other. Return spring means (not shown) may be provided to return mirror 78 to the original position upon deenergization of solenoid 80.

OPERATION

In the COPY mode, latent electrostatic images are formed on the photoconductive surface 19 of drum 18 through exposure of the document 13 on platen 12 as described heretofore. In the WRITE mode, latent electrostatic images are created on the charged photoconductive surface 19 of drum 18 by means of the flying spot scanner 59 in accordance with image signals input thereto. In this mode, solenoid 81 is energized to move control mirror 78 to the WRITE position (the dotted line position shown in FIG. 1). In this position, mirrors 78, 85 cooperate to provide image WRITE beam 64 at a point on the surface 19 of drum 18 upstream of developing station 22. Modulator 65 modulates the light intensity of beam 64 in accordance with the content of the image signals input thereto so that image WRITE beam 64 dissipates the electrostatic charge on the drum surface to create a latent electrostatic image representative of the image signals input thereto as beam 64 scans thereacross. The electrostatic latent image so created is thereafter developed by magnetic brush 25 and transferred to copy substrate material 28 by corona transfer means 27 at transfer station 26. Following transfer, the surface of drum 18 is cleaned by cleaning brush 33 as described.

In this mode, and in the image READ mode described below, deflector 68 is continually driven at substantially constant velocity by motor 72. In the WRITE mode, the image signal source is controlled so as to be synchronized with rotation of deflector 68. The rotational rate of xerographic drum 18 which determines the spacing of the scan line, is preferably synchronized to the signal source in order to maintain image linearity.

In the image READ mode, where it is desired to read original 13 and convert the content thereof to image signals, solenoid 81 is de-energized to place control mirror 78 in the READ position (the solid line position shown in FIG. 1). In this position, mirror 78 cooperates with mirror 80 to cause READ developed thereon.

In this mode, a latent electrostatic image of the original 13 on platen 12 is created on the surface 19 of drum 18 through exposure of the original 13 and subsequent development by magnetic brush 25 in the manner described heretofore. As the developed image is carried on drum 18 from developing station 22 to transfer station 26, the image is scanned line by line by image READ beam 63. The light is reflected from the photoconductive surface 19 in accordance with the presence or absence of toner on the drum surface, the reflected light being picked up by collector 100 and converted to image signals as will appear hereinafter. As will be understood where the light beam strikes toner, the light is absorbed and no light is reflected. Where the light beam strikes uncovered portions of the photoconductive surface 19 of drum 18, the light is scattered and reflected back by the photoconductive surface to collector 100. The presence or absence of light is sensed by collector 100 which provides an analog image signal representative of the developed image scanned as will appear. Image signals generated by collector 100 may be used to produce additional copies of the original 13, or stored, or transmitted to a distant point, etc..

Following scanning, the developed image on drum 18 may be transferred to substrate material 28 in the manner described heretofore. Alternately, transfer may be dispensed with and the drum surface cleaned by cleaning brush 33.

Figure 2:
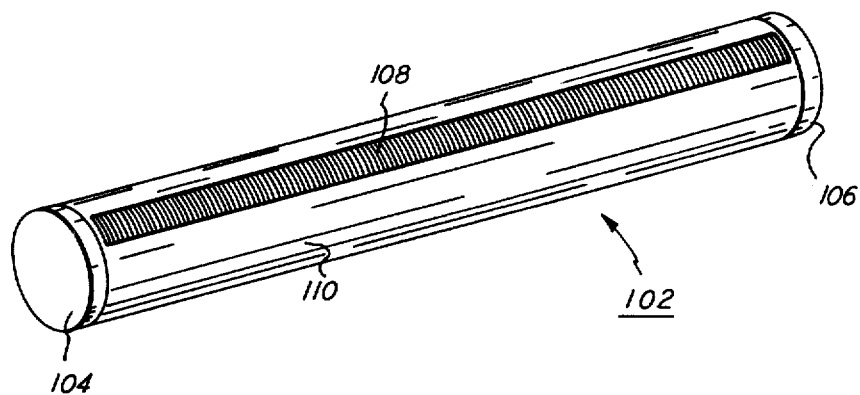
FIG. 2 is perspective end view of a first embodiment of the light collector shown in FIG. 1.
Figure 3:
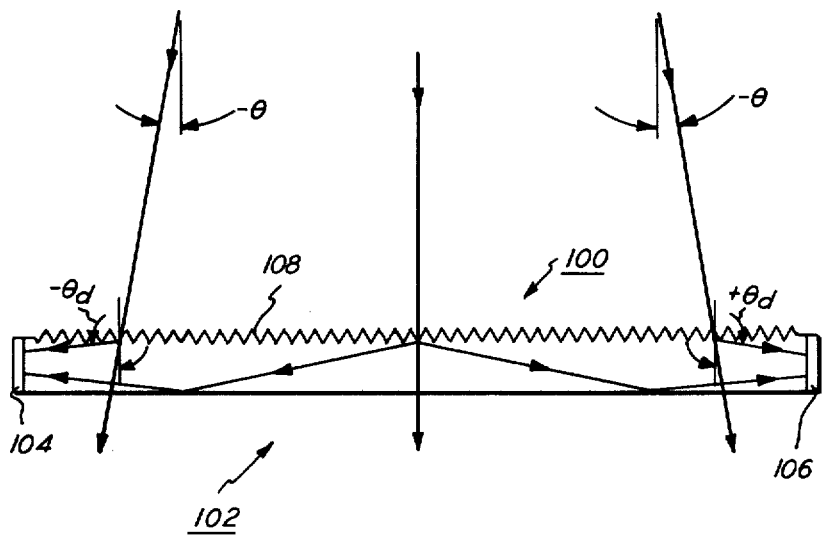
FIG. 3 is a cross-sectional side view of the light collector shown in FIG. 1.

Referring to FIGS. 2 and 3, collector 100 consists of a cylindrical glass rod 102 having photodetectors 104, 106 provided at both ends of the rod. Along one longitudinally extending surface of the rod has been formed variable period diffraction grating 108. Grating 108 is of sufficient length and width to provide an acceptance angle range sufficient to capture reflected light from the photoconductive surface and redirect the incident light into the rod interior in diffraction parts which are determined by the angle of the incident rays, the grating period and the index of refraction of the rod material.

Referring particularly to FIG. 3, it is seen that the function of grating 108 is to achieve maximum light coupling of incident light to the photodetectors. This is accomplished by varying the period of grating 108 so that light incident on the grating near the ends of rod 102 are directly coupled to the photodetectors while light incident in the center portions of the grating is diffracted so as to undergo a single internal reflection at the opposing rod surface; thence to impinge on the photodetector. Some light is lost, of course, in the form of those zero and first order components of the diffracted light which either pass directly through the rod or which strike the opposing surface at less then the critical angle necessary for internal reflection.

This optimum diffraction pattern can be accomplished when the system design criteria are established. As an example, referring again to FIG. 3, the particular grating pattern that has been selected is symmetrical about the center. From the center outward the incident angle extents to $-\theta\lambda$ values at the ends. The diffraction angle is $\pm\theta_d$ at the ends. For these conditions, the required grating period for any portion of grating 108 is defined by the expression:

$$d = (N_1 \sin \theta HD\ i + N_2 \sin \theta_d)(\lambda) \tag{1}$$

where
- $N_1$ = index of refraction of the medium surrounding the collector
- $N_2$ = rod index
- $\theta_i$ = incident angle
- $\theta_d$ = first order diffraction angle
- $\lambda$ = incident light wavelength For $N_1 = 1.0$; $N_2 = 1.5$ and $\lambda = 0.6328$ m, d would vary from ~0.43 μm at the center to ~0.49 μm at the end points for the FIG. 3 embodiment.

As shown in FIG. 3, with the incident light normal to the grating, the first order diffracted rays are totally internally reflected producing an exceptionally strong signal level at the photodetectors relative to the signals produced nearing the ends. The detector output can be smoothed and made more constant by modulating the diffracted image in the center portion of the grating so as to cause less efficient light coupling into the photodetector. This can be accomplished, for example, in a thin film grating by changing the grating depth.

Figure 4:
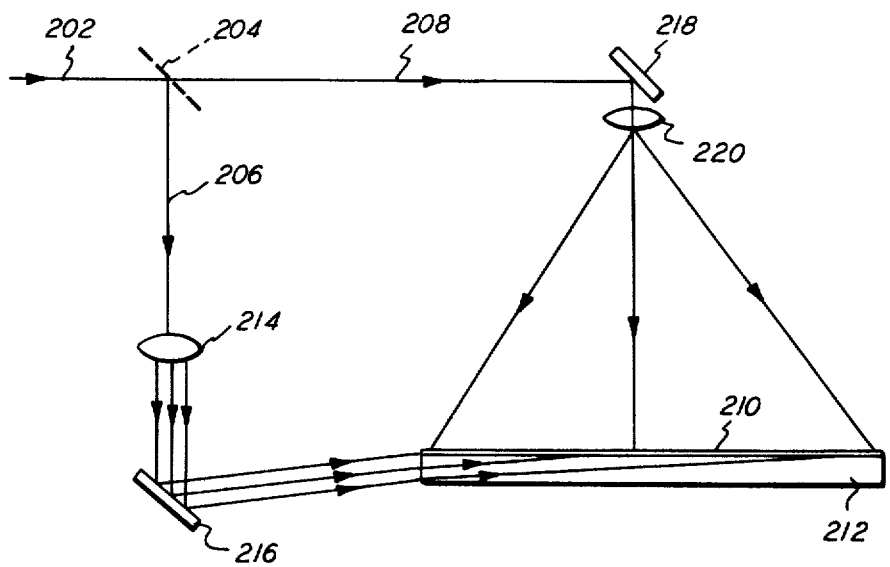
FIG. 4 shows an optical system for holographically fabricating the variable period diffraction grating surface of the collector.

One method of fabricating a variable period diffraction grating according to the invention is shown in FIG. 4. In this holographic system shown in FIG. 4, forming laser beam 202 is split by beamsplitter mirror 204 into object beam 206 and reference beam 208. Object beam 206 is directed onto photosensitive coating 210 of holographic plate 212 via expander lens 214 and mirror 216. Reference beam 208 forms an interference wavefront on the coating after reflection from mirror 218 and diverging lens 220. The expected range of incident angles for the scan beam is accounted for by choice of focal length and position of lens 220 in the reference beam. Anamorphic optics can be used in the reference beam path to account for any difference in angular requirement that might exist for the scan and cross-scan directions.

Coating 210 could be a photoresist material such as Shipley AZ-1350 thereby forming a surface relief grating. Alternativly the coating could be a silver halide material or photo polymer that can be developed to produce a volume grating. In either case, the grating medium can be affixed along the appropriate area of the collector rod. The diffraction grating can also be formed directly on the rod surface by etching using chemical or particle beam techniques or by ruling.

Figure 5:
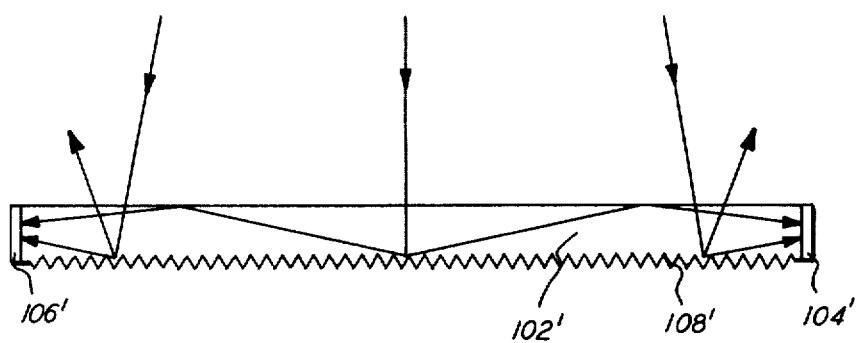
FIG. 5 is a cross-sectional view of a second embodiment of a light collector employing a reflective type grating.

The grating 108 formed in FIG. 4 is depicted as existing on the top surface of plate 212. This produces the transmission type grating shown in FIGS. 1 through 3 since object beam 208 is totally internally reflected from the coated surface. Reflection gratings can be fabricated by placing coating 210 on the bottom surface of plate 212 and redirecting object beam 206 so that it makes the same angle of incidence at the bottom surface as it has with the top surface. A reflection grating can then be used in the embodiment shown in FIG. 5. The incident light now passes through rod 102' and is diffracted in the desired pattern from reflective variable period grating 108' to impinge upon photodetectors 104',106'.

As mentioned above, the grating acceptance angle is designed with an acceptance angle range which permits capture of as much of the reflected light from the photoconductive surface as is consistent with the system scan angle. While effectively recovering and directing light specularly reflected from the photoreceptor, diffusely reflected light from outside the photoreceptor is incident on the grating at various angles and the diffraction pattern does not effectively couple this light to the photoreceptor. And, as indicated above, some portion of the specular reflected incident beams pass through the rod and hence creates some loss in collector efficiency. The collector efficiency can be enhanced by the expedient of painting or aluminizing various areas of the rod along the interior surface opposite the grating. This selective coating would redirect some of the zero and first order rays, which would ordinarily be lost, back towards the photodetectors. This concept can be extended to enhance an integrating cavity collector of the type described in co-pending application 183,134 filed on Sept. 2, 1980 by the same applicant as for the instant application. A grating element could be placed within an integrating cavity to help direct the light to the photodetectors. The grating itself can be altered so that it will accommodate both specular and scattered light from the photoreceptor. This alteration is performed by placing a diffusing element in the reference beam path of FIG. 2, to simulate the scattering properties of the photoreceptor. A hologram formed with the diffuser element would have lower diffraction efficiency for the specular beam when compared to the non-diffuser version, due to intermodulation fringes, but would direct a portion of the scattered light to the photodetector.

Although the above-described embodiments refer to specific construction aspects, other modifications are possible without departing from the spirit of the invention. For example, although the embodiment shown in FIGS. 2 and 3 have a variable period grating, a fixed period grating may also be used depending upon the system design. And the invention need not be limited to a cylindrical rod configuration; other configurations such as a four-sided bar type member may also be used. Other materials besides glass, e.g. plastics having suitable transparent qualities and index of refraction may be suitable for the collector material. Use of plastic materials lends itself well to replication techniques. For example, a master can first be made and then replicated by using embossing or injection molding techniques.

Finally, although a photodetector is shown at each end of the collector, for some systems a single photodetector may suffice.

What is claimed is:

1. A light collector comprising a transparent elongated member having at least one photodetector placed thereon, said member having on one surface thereof a longitudinally extending diffraction grating, said grating having a period selected so as to cause light incident on said grating to be coupled to said photodetector either directly or by internal reflection along the interior surface of said member.

2. The light collector of claim 1 wherein the grating period varies in direct relation to the angle of said incident light according to the following expression $d = \lambda(N_1 \sin \theta_i + N_2 \sin \theta_d)$ where $N_1$ = the index of refraction of the medium surrounding the collector
$N_2$ = the index of refraction of the rod-like member
$\theta_i$ = the angle of incidence at the grating
$\theta_d$ = the first order diffraction angle of the grating
$\lambda$ = wavelength of the incident light 3. The light collector of claim 1 wherein said grating is formed as a surface relief transmission grating.

4. The light collector of claim 1 wherein said grating is formed as a volume grating.

5. The light collector of claim 1 wherein said grating is formed as a reflection-type grating.

6. The light collector of claims 1 or 3 wherein the inner surface of said member opposite said grating has selective reflective coatings applied thereto at location designed to reflect zero order components of said diffracted light towards said photodetector.

7. The light collector of claim 1 wherein said elongated member is a cylindrical rod.

8. The light collector of claim 1 wherein said member has been replicated using embossing techniques.

9. The light collector of claim 1 wherein a photodetector is located at each end of said member.

10. In a flying spot scanning system adapted to raster scan on information-bearing surface, a light collector for collecting light reflected from said scanned surface, said light collector comprising a transparent elongated member having at least one photodetector placed thereon, said member having on one surface thereof a longitudinally extending diffraction grating, said grating having a period selected so as to cause light reflected from said information-bearing surface and incident on said grating to be coupled to said photodetector either directly or by internal reflection along the interior surface of said member.

11. The scanning system of claim 10 wherein said grating period varies in direct relation to the angle of said incident light according to the following expression $d = \lambda(N_1 \sin \theta_i + N_2 \sin \theta_d)$ where $N_1$ = the index of refraction of the medium surrounding the collector
$N_2$ = the index of refraction of the rod-like member
$\theta_i$ = the angle of incidence at the grating
$\theta_d$ = the first order diffraction angle of the grating
$\lambda$ = wavelength of the incident light.

12. The scanning system of claim 10 wherein said grating is formed as a surface relief transmission grating.

13. The scanning system of claim 10 wherein said grating is formed on a reflection-type grating.

14. The scanning system of claim 10 wherein said grating is formed as a volume grating.

15. The scanning system of claim 10 wherein said grating is a cylindrical glass rod and wherein a photodetector is located at each end of the rod.

16. The scanning system of claim 10 wherein said information-bearing surface is a toned image on a photoreceptor surface.

* * * * *